J. A. SMITH.
FLASH LIGHT APPARATUS.
APPLICATION FILED AUG. 18, 1911.
1,026,329.
Patented May 14, 1912.
2 SHEETS—SHEET 1.
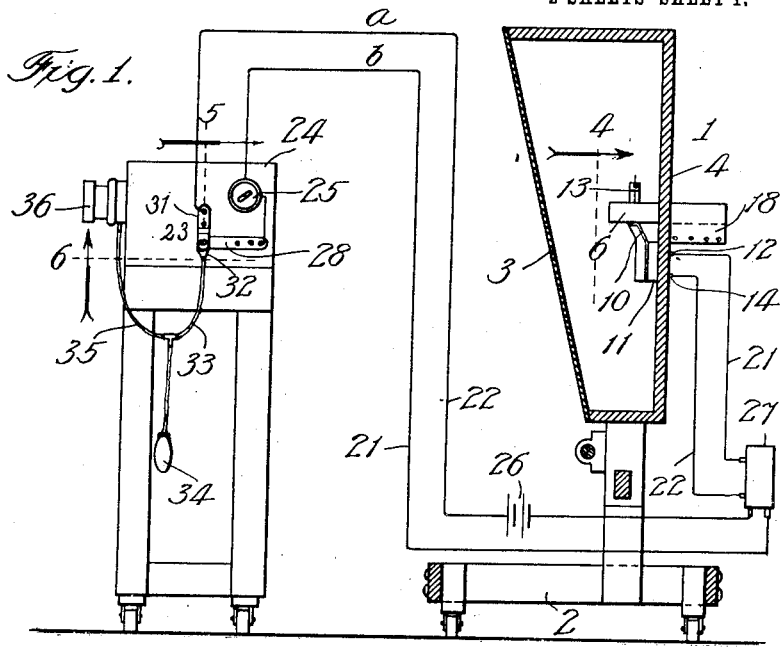
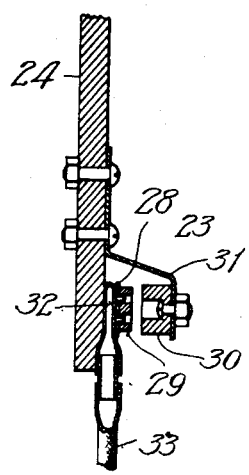
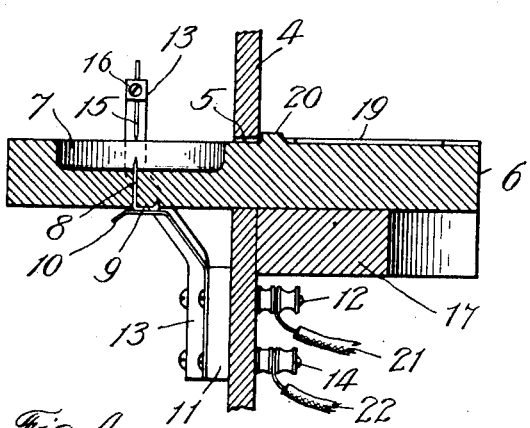
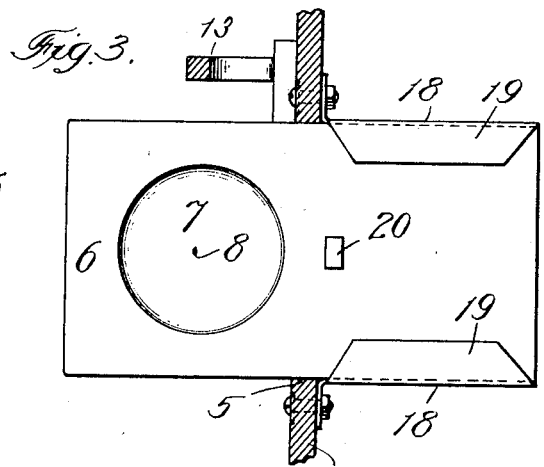
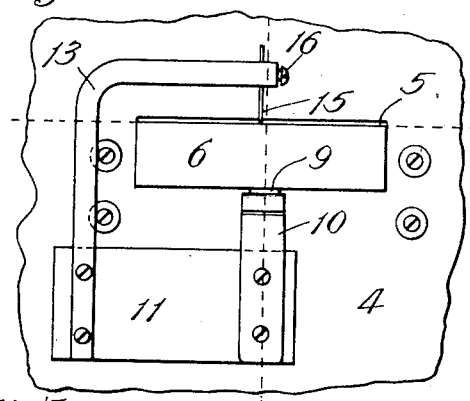
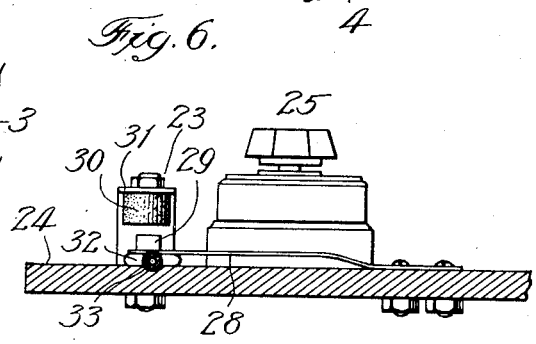
Witnesses:
Inventor:
Jay A. Smith
By David H. Fletcher,
Atty's.

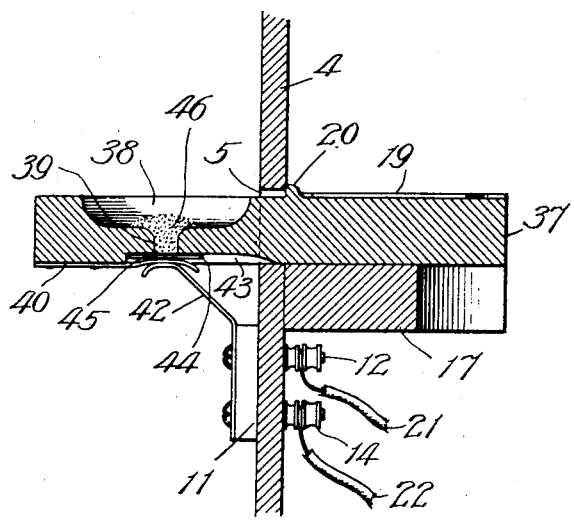
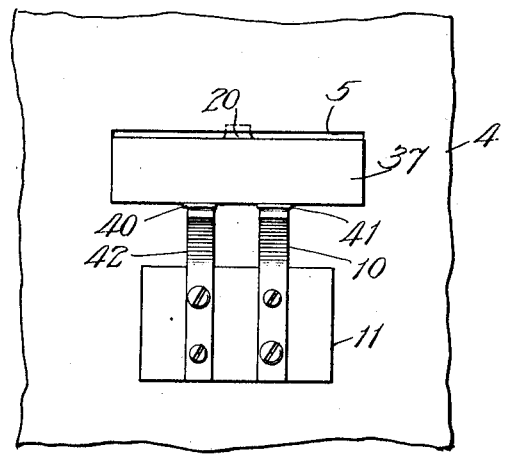
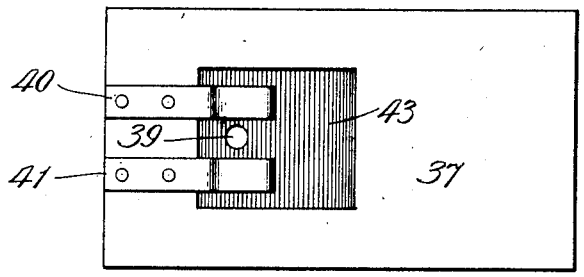
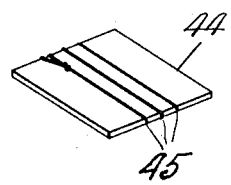

UNITED STATES PATENT OFFICE.

JAY A. SMITH, OF CHICAGO, ILLINOIS.

FLASH-LIGHT APPARATUS.

1,026,329.  Specification of Letters Patent.  Patented May 14, 1912.

Application filed August 18, 1911. Serial No. 644,822.

*To all whom it may concern:*

Be it known that I, JAY A. SMITH, a citizen of the United States, residing at Chicago, in the county of Cook and State of Illinois, have invented certain new and useful Improvements in Flash-Light Apparatus, of which the following is a description, reference being had to the accompanying drawings, forming a part of this specification, in which corresponding letters of reference in the different figures indicate like parts.

The object of my invention is to provide a simple and effective flashlight apparatus which shall be adapted, more especially, for use in photographic studios and so constructed as to include novel means whereby an indefinite number of flashlight charges may be provided ready for use in quick succession.

A further object is to insure the ignition of the charges by electrical means while avoiding a premature explosion.

Moreover, it is my purpose to provide means whereby the operation of the camera shutter and the closing of the electric circuit may be simultaneous and noiseless so that no click or other sound or signal may be given to arrest the attention of, or disturb the sitter previous to the flash.

To these ends, my invention consists in the combination of elements hereinafter more particularly described and definitely pointed out in the claims.

In the drawings, Figure 1, is a view showing a camera and flashlight case, the former being in elevation and the latter in vertical section with electrical circuits between the two shown diagrammatically, Fig. 2, is a vertical section taken upon the line 2, Fig. 4, viewed in the direction of the arrow there shown, representing the removable flash-powder holder in position for use with the electrical connections, Fig. 3, is a sectional view in plan taken upon the line 3, Fig. 4, Fig. 4, is a view of a portion of the interior of the flashlight closure taken upon the line 4, Fig. 1, viewed in the direction of the arrow there shown, Figs. 5, and 6, respectively, are sectional views taken upon the lines 5, and 6, Fig. 1, viewed as indicated by the arrow shown in said respective lines, Fig. 7, is a sectional view corresponding to that shown in Fig. 2, showing a modified construction, Fig. 8, is a view corresponding to that shown in Fig. 4, but representing said modified construction, Fig. 9, is a bottom view of a modified form of tray and Fig. 10, is a perspective view of a card strip showing a fuse-wire connected therewith.

Referring to the drawings, 1 represents generally a flashlight closure mounted upon a movable supporting frame 2, of any well known construction. The front 3 is made of any suitable translucent fabric or light transmitting material, while the back 4, as well as the top, bottom and sides may be formed from wood, sheet metal or other opaque substance. An opening 5, Figs. 2, and 4, is formed in the back 4, to provide for the insertion of a sliding flashlight powder receptacle or tray generally designated by 6, which consists of a flat rectangular block of porcelain or other electrical insulating material adapted to withstand the action of heat. Said block is provided with a powder holding depression or cavity 7, and a metallic contact element 8, which is projected upwardly through the block with its point or terminal above the bottom of said cavity. An enlarged flat head 9 is formed upon the lower end of the part 8 and arranged to project slightly below the bottom surface of the block so as to readily contact with the upper face of flat bent metallic contact-spring 10 which is secured to an insulating block 11 attached to the inner surface of the back 4, said contact-spring being in metallic connection with a binding-screw 12 upon the exterior of said back. A metal arm 13, is attached to the insulating block 11 and in metallic connection with a binding screw 14 upon the exterior of said back. Said arm is extended upwardly and laterally over the block 6 and is provided with a needle-like terminal 15 which is adjustably secured in the end of the arm by means of a set-screw 16, and arranged to stand in proximity to and in substantial alinement with the terminal 8.

A cleat or reinforcement 17, is rigidly attached to the exterior of the back 4, to serve as a bottom support for the sliding block 6 said cleat having sheet metal plates 18 attached to opposite sides thereof with inturned horizontal flanges 19 at the top, said cleat, plates and flanges serving to support and guide the movement of the block when it is inserted or withdrawn. A stop 20, upon the top of the block, serves to limit its inward movement. The binding posts 12 and 14 are connected by means of leads 21 and 22 Fig. 1, with a circuit closer generally designated by 23 and preferably mounted upon a camera box 24. A switch 25, battery 26 and spark-coil 27 are interposed in said circuit. The circuit closing device 23, consists of a flat spring 28 attached at one end to the casing 24 and in metallic connection with the lead 21, said spring being provided with a metal contact element 29 upon its free end adapted to be pressed against a carbon contact element 30, Figs. 5 and 6, upon the end of a metallic arm 31, which is also attached to said casing and in metallic connection with the lead 22. The tension of the spring 28 serves to hold the contact elements 29 and 30 normally apart. I have found in practice that by making one of the contact elements of carbon the fusing of the two will be prevented.

Beneath the free end of the spring 28 is located a closed elastic bag or air receptacle 32 formed from india-rubber or other suitable material which is connected by means of a tube 33 with a pneumatic operating bulb 34, said bulb being also connected in a well known way by means of a branch tube 35 with the camera shutter in the lens 36. Said devices may be operated as follows:

It is my purpose to utilize a number of the trays 6 in connection with each apparatus, the depression 7, of each being supplied with the requisite quantity of flash powder. When so supplied, the trays may be stacked upon each other near to the apparatus so as to be used in quick succession when desired. When a tray is slid into place as shown in Figs. 1 and 2, the head 9 of the spark terminal 8, forms a metallic contact with the spring in the normally open electric circuit which is held open by the circuit closer 23, as well as by the switch 25. Upon closing the latter the apparatus is ready for use. Pressure upon the bulb 34 will cause air to be forced into the bag 32, thereby expanding it sufficiently to actuate the spring 28 and move the contact element 29 into contact with the part 30, thus closing the circuit and causing a spark to pass between the points 8 and 15 which ignites the flashlight powder. At the same time the pressure of air in the branch tube 35 serves to open the shutter and expose the sensitized plate. The strength of the spring should be such that the air pressure required to make the contact may be ample to insure the closing of the shutter, otherwise it might fail to open.

While I prefer to employ a "jump-spark" in connection with my improved tray, where the requisite current is available, I do not wish to be limited thereto, inasmuch as it may be used in conjunction with a fuse-wire by slightly modifying the construction. Such a modification is shown in Figs. 7 to 9 inclusive. The back 4, with its opening 5 and tray supporting and guiding means, is unchanged. The tray 37, is provided with a powder receiving depression 38 at its forward end which is provided with a restricted opening 39 at the bottom. Metal contact springs 40, 41, are attached to the bottom of the tray which is preferably made entirely of insulating material and said springs are so placed as to contact with springs 10 and 42, mounted upon the insulating block 11 and in metallic connection with the binding screws 12 and 14, the spring 42 being substituted for the member 13 shown in the first described construction, while the spring 10 is unchanged. The free ends of the springs 40 and 41 are extended over a depression 43 formed in the bottom of the tray, which depression is made to receive a fuse member adapted to form a metallic connection between the springs 40 and 41 and also a temporary closure for the bottom of the opening 39. In Fig. 10, I have shown a fuse-member adapted to this purpose, which consists of a small sheet 44, of cardboard, paper, wood or other suitable material, having a small fuse-wire 45, wound around it or otherwise secured thereto. When the card is inserted beneath the springs as shown in Fig. 7, the opening is temporarily closed and the flashlight powder 46, when placed in the tray is brought into direct contact with the wire, which, in turn contacts with said springs, so that the fusing of the wire upon closing the circuit serves to ignite the powder.

Having thus described my invention, I claim:

1. The combination with a flashlight closure having an opening therein for the reception of a flashlight tray, a normally open electric circuit, contact elements upon said tray and closure respectively for closing a lead of an electric circuit to ignite powder within said tray, when said circuit is closed, and a normally open circuit closer interposed in said circuit.

2. The combination with a flashlight closure having an opening therein, of a powder-receiving tray adapted to enter said opening, said tray being formed from refractory insulating material, an electric circuit, a normally open circuit closer interposed therein, a spark terminal carried by said tray, means for causing a metallic connection between the same and a lead of said circuit and a stationary spark terminal within said closure in operative proximity to said first named terminal when said tray is in position.

3. The combination with a flashlight closure having an opening in one of its walls, of a flashlight powder tray formed from insulating material, said tray being adapted to be projected horizontally through said opening, a normally open electric circuit, means within said tray for igniting powder therein when said circuit is closed, contact elements upon said tray and closure respectively for closing a portion of said circuit when said tray is in position for use, and means for closing said circuit.

4. The combination with a flashlight closure having an opening in one of its walls, of a flashlight powder tray adapted to be projected horizontally through said opening, said tray being formed from refractory insulating material, an electric spark terminal arranged to extend through said tray into the powder receptacle thereof, an opposing spark terminal located within said closure, a normally open electric circuit, a contact element within said circuit for engaging said first named terminal when said tray is in position for use and means for closing said circuit.

In testimony whereof, I have signed this specification in the presence of two subscribing witnesses, this sixth day of July 1911.

JAY A. SMITH.

Witnesses:
DAVID H. FLETCHER,
JENNIE L. FISKE.